United States Patent [19]

Ando et al.

[11] Patent Number: 4,771,379

[45] Date of Patent: Sep. 13, 1988

[54] DIGITAL SIGNAL PROCESSOR WITH PARALLEL MULTIPLIERS

[75] Inventors: Hideki Ando; Masao Nakaya; Harufusa Kondo, all of Hyogo, Japan

[73] Assignee: Mitsubishi Denki Kabushiki Kaisha, Tokyo, Japan

[21] Appl. No.: 922,031

[22] Filed: Oct. 21, 1986

[30] Foreign Application Priority Data

Oct. 23, 1985 [JP] Japan .................................. 60-238829

[51] Int. Cl.$^4$ .............................................. G06F 7/52
[52] U.S. Cl. .................................................... 364/200
[58] Field of Search ................................ 364/200, 900

[56] References Cited

U.S. PATENT DOCUMENTS 4,593,378 6/1986 McWhirter et al. ................ 364/900

FOREIGN PATENT DOCUMENTS 2142636 7/1978 Fed. Rep. of Germany .

OTHER PUBLICATIONS

"A Single-Chip Digital Signal Processor for Voiceband Applications", Yuichi Kawakami et al., 1980 IEEE International Solid-State Circuits Conference, pp. 40-41.

Larson, "High-Speed Multiply Using Four Input Carry-Save Adder" *IBM Technical Disclosure Bulletin*, vol. 16, No. 7 (Dec., 1973):2053-2054.

*Primary Examiner*—Raulfe B. Zache
*Attorney, Agent, or Firm*—Lowe, Price, Leblanc, Becker & Shur

[57] ABSTRACT

An arithmetic operation portion 3 comprises a plurality of multipliers 311 and 312 connected directly with a memory portion 1 so that multiplication processing can be performed in parallel. As a result, the processing capacity for multiplication and addition can be increased and the throughput rate of data can be improved.

6 Claims, 4 Drawing Sheets

DIGITAL SIGNAL PROCESSOR WITH PARALLEL MULTIPLIERS

BACKGROUND OF THE INVENTION

1. Field of the Invention

The present invention relates to a digital signal processor and particularly to a digital signal processor improved to perform digital signal processing efficiently.

2. Description of the Prior Art

A digital signal processor is a microprocessor dedicated to digital signal processing, developed for the purpose of rapidly performing arithmetic operations of multiplication and addition frequently required for digital signal processing.

FIG. 1 is a schematic block diagram showing an example of a conventional digital signal processor disclosed for example in "A Single-Chip Digital Signal Processor for Voiceband Applications" by Y. Kawakami et al., 1980 IEEE International Solid-State Circuits Conference, pp. 40–41. Referring to FIG. 1, the digital signal processor comprises, as in an ordinary microcomputer, a memory portion 1, a control portion 2, an arithmetic operation portion 3 and a data bus 4. The memory portion 1 comprises a random access memory (referred to hereinafter as a RAM) 11 and a read-only memory (referred to hereinafter as a ROM) 12. Data to be processed in the arithmetic operation portion 3 and data necessary for the processing are stored in the RAM 11 and the ROM 12. Non-fixed data is stored in the RAM 11 and fixed data (for example, constant data, etc. for multiplication) is stored in the ROM 12. The RAM 11 and the ROM 12 are connected with the data bus 4.

The control portion 2 comprises an instruction ROM 21, a program counter 22, an instruction register 23 and an instruction decoder 24. Program data is stored in the instruction ROM 21. The program counter 22 reads out successively the program data from the instruction ROM 21 in synchronism with a basic clock (not shown) of the digital signal processor. The instruction register 23 stores temporarily the program data read out from the instruction ROM 21. An output from the instruction register 23 is supplied to the instruction decoder 24. Part of bit output from the instruction register 23 is supplied to the data bus 4. The instruction decoder 24 decodes the program data received from the instruction register 23 and provides various control signals. Those control signals are supplied to the memory portion 1, the control portion 2, the arithmetic operation portion 3, etc. so as to control operation of the internal circuits of those components.

The arithmetic operation portion 3 comprises a multiplier 31, an arithmetic and logic unit (referred to hereinafter as an ALU) 32 and an accumulator 33. Inputs of the multiplier 31 are connected with the data bus 4. One of the inputs of the multiplier 31 is connected directly with the RAM 11 and the other input thereof is connected directly with the ROM 12. An input of the ALU 32 is connected with the data bus 4 and is connected directly with the multiplier 31. The other input of the ALU 32 receives an output from the accumulator 33. An output from the ALU 32 is supplied to the accumulator 33. The accumulator 33 is connected with the data bus 4.

In the above described construction, the multiplier 31 multiplies a value read out from the RAM 11 by a constant read out from the ROM 12 and supplies the result of multiplication to the ALU 32. The ALU 32 adds the result of multiplication by the multiplier 31 to the accumulating total value of the results of multiplication obtained so far and stored in the accumulator 33 so that the result of addition is stored in the accumulator 33. The accumulating value stored in the accumulator 33 is provided through the data bus 4.

Thus, since the digital signal processor comprises the multiplier 31 as a hardware circuit dedicated to multiplication processing, multiplication processing can be performed at a higher speed as compared with the case of performing multiplication as repetition of addition operation in the ALU 32 as in a conventional microcomputer. In addition, since the multiplier 31 is connected directly with the RAM 11 and the ROM 12, data can be set in the multiplier 31 by one instruction. Furthermore, since the multiplier 31 is connected directly with the ALU 32, a result of multiplication can be set in the ALU 32 by one instruction. Thus, data paths for arithmetic operations of multiplication and addition are provided separately from the data bus 4 and accordingly arithmetic operations of multiplication and addition can be performed simultaneously with transfer of data and processing for arithmetic operations of multiplication and addition can be performed at high speed.

However, in such a digital signal processor as described above, the calculating speed in the multiplier 31 is slowest compared with the processing speed in other circuits. As a result, in such a conventional digital signal processor, the throughput rate is usually determined dependent on the calculating speed of the multiplier 31 and further improvement in the throughput rate cannot be made.

SUMMARY OF THE INVENTION

An object of the present invention is to provide a digital signal processor having a higher throughput rate compared with a conventional digital signal processor.

Briefly stated, the present invention comprises a plurality of multipliers in an arithmetic operation portion and those multipliers are connected directly with data memories and are also connected directly with an arithmetic and logic unit.

According to the present invention, there are provided a plurality of multipliers connected directly with data memories so that multiplication processing can be performed simultaneously. Thus, the processing capacity for multiplication and addition can be remarkably increased compared with a conventional digital signal processor and accordingly the throughput rate of data can be improved.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
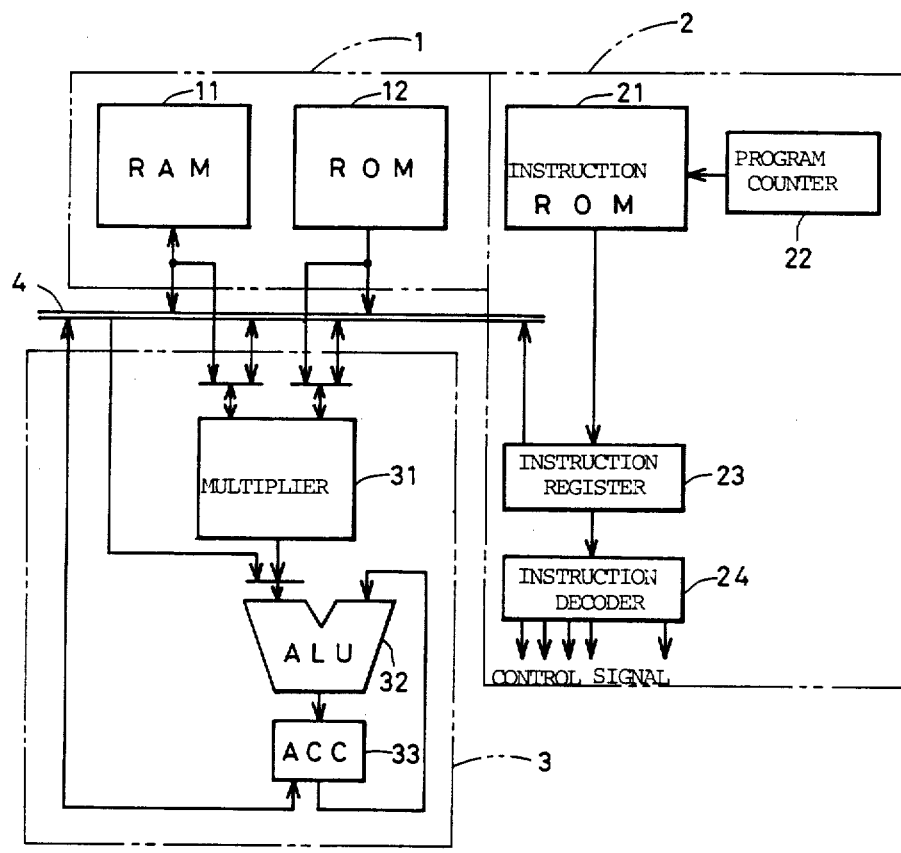
FIG. 1 is a schematic block diagram showing an example of a conventional digital signal processor.
Figure 2:
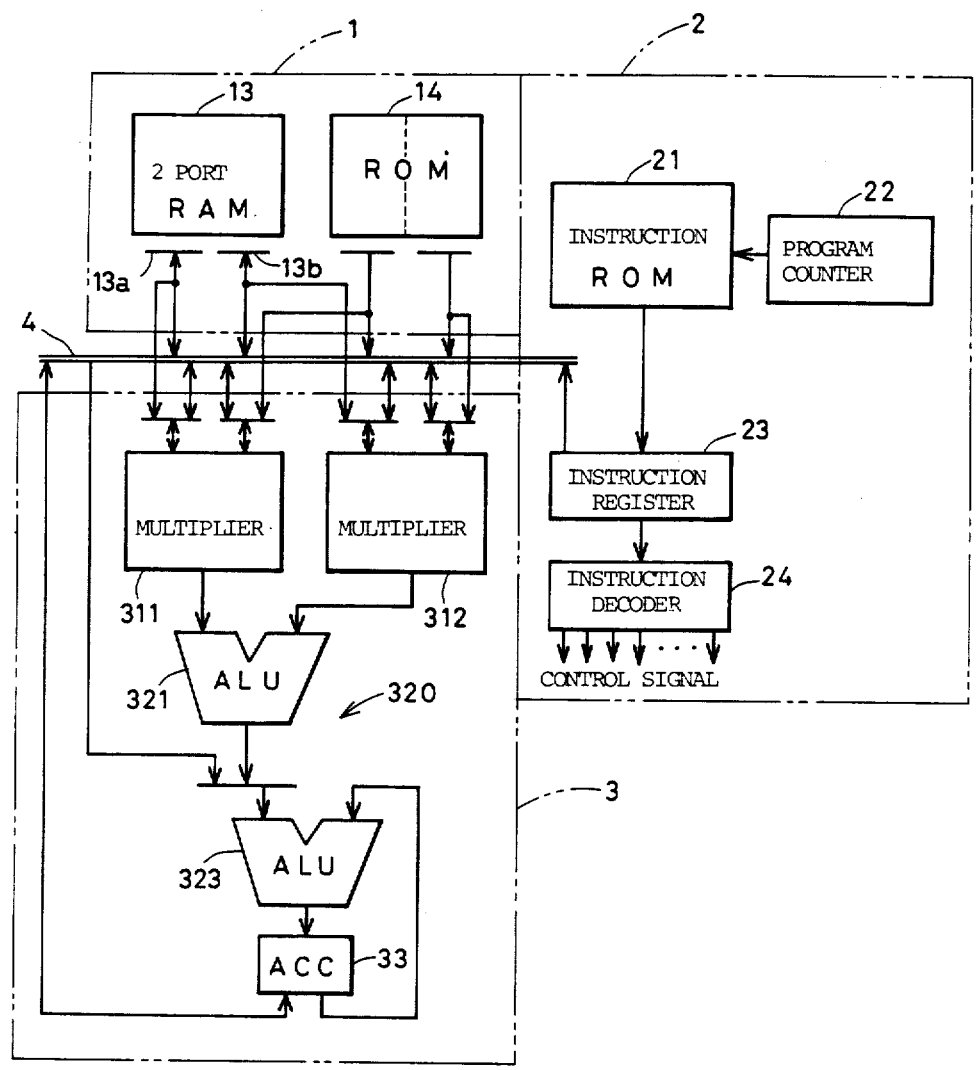
FIG. 2 is a schematic block diagram showing an embodiment of the present invention.

FIG. 2 is a schematic block diagram showing an embodiment of the present invention. This embodiment is the same as the conventional example shown in FIG. 1 except for the below described points and therefore the same portions are denoted by the same reference numerals and description thereof is omitted. Referring to FIG. 2, this embodiment comprises a memory portion 1, a control portion 2, an arithmetic operation portion 3 and a data bus 4 as in the conventional example in FIG. 1. The control portion 2 is entirely the same as that of the conventional example in FIG. 1. The memory portion 1 comprises a two-port RAM 13 instead of the RAM 11 in FIG. 1. The two-port RAM 13 comprises two output ports so that data can be read out simultaneously from two addresses. The data read out from an address is provided from the first port 13a. The data read out from the other address is provided from the second port 13b. Those first and second ports 13a and 13b are connected with the data bus 4. The memory portion 1 comprises a ROM 14 having two memory areas instead of the ROM 12 in FIG. 1. This ROM 14 has two memory areas formed on the same chip, for example, each functioning as a ROM, so that data can be read out simultaneously from the two memory areas. Each memory area of the ROM 14 is connected with the data bus 4.

The arithmetic operation portion 3 comprises two multipliers 311 and 312, two ALU's 321 and 322 and an accumulator 33. An input of the first multiplier 311 is connected with the data bus 4 and is also connected directly with the first port 13a of the two-port RAM 13. The other input of the first multiplier 311 is connected with the data bus 4 and is also connected directly with one of the memory areas of the ROM 14. An input of the second multiplier 312 is connected with the data bus 4 and is also connected directly with the second port 13b of the two-port RAM 13. The other input of the second multiplier 312 is connected with the data bus 4 and is also connected directly with the other memory areas of the ROM 14. An input of the first ALU 321 is connected directly with the first multiplier 311 and the other input thereof is connected directly with the second multiplier 312. An input of the second ALU 322 is connected with the data bus 4 and is also connected directly with the first ALU 321. The other input of the second ALU 322 receives an output from the accumulator 33. These first and second ALU's 321 and 322 constitute an arithmetic and logic unit 320. An output from the second ALU 322 is supplied to the accumulator 33. The accumulator 33 is connected with the data bus 4.

In the following, operation of the above stated embodiment will be described. The program data stored in the instruction ROM 21 is successively read out by the program counter 22 and stored in the instruction register 23. The instruction decoder 24 reads out and decodes the program data stored in the instruction register 23 and provides various control signals. Those control signals are supplied to the memory portion 1, the control portion 2, the arithmetic operation portion 3, etc. so as to control the operation of those components.

On the other hand, data provided from the first port 13a of the two-port RAM 13 is supplied directly to one of the inputs of the multiplier 311, not through the data bus 4. Data provided from the second port 13b of the two-port RAM 13 is also supplied directly to one of the inputs of the second multiplier 312, not through the data bus 4. In addition, data read out from one of the memory areas of the ROM 14 is supplied directly to the other input of the first multiplier 311, not through the data bus 4. Data read out from the other memory areas of the ROM 14 is also supplied directly to the other input of the second multiplier 312, not through the data bus 4. Accordingly, the first multiplier 311 multiplies the data provided from the first port 13a of the RAM 13 by the data read out from one of the memory areas of the ROM 14. The second multiplier 312 multiplies the data provided from the second port 13b of the RAM 13 by the data read out from the other memory area of the ROM 14. The results of multiplication by the first and second multipliers 311 and 312 are supplied to the first ALU 321 so that those results are added. The result of addition by the first ALU 321 is supplied directly to the second ALU 322, not passing through the data bus 4. The second ALU 322 adds the result of multiplication by the first ALU 321 to the accumulating total value of the results of multiplication obtained so far and stored in the accumulator 33 so that the result of addition is stored in the accumulator 33. The accumulating total value of the results of multiplication stored in the accumulator 33 is provided through the data bus 4.

As described above, the embodiment shown in FIG. 2 comprises two multipliers and two ALU's and as a result, as for arithmetic operations of multiplication and addition, this embodiment has processing capacity twice as large as that of the conventional digital signal processor shown in FIG. 1. Accordingly, the throughput rate of data can be made twice as much, compared with the conventional example in FIG. 1. In addition, since the first and second multipliers 311 and 312 are connected directly with the RAM 13 and the ROM 14, data can be set in the two multipliers 311 and 312 by one instruction and thus the processing efficiency can be improved.

Although the above described embodiment comprises two multipliers and two ALU's, if three or more multipliers and three or more ALU's are provided, the processing capacity for multiplication and addition can be further increased according to the number of multipliers and ALU's. In such a case, in order to set data simultaneously in the respective multipliers, it is necessary to provide a RAM having ports the number of which is equal to the number of the multipliers, instead of the two-port RAM 13, or to provide one-port RAM's the number of which is equal to the number of the multipliers. In the same manner, it is necessary in such a case to provide, instead of the ROM 14 having two memory areas, a ROM having memory areas the number of which is equal to the number of the multipliers or to provide ROM's having a single memory area, the number of the ROM's being equal to the number of multipliers.

In addition, although the non-fixed data stored in the two-port RAM 13 is multiplied by the fixed data (such as constant data) stored in the ROM 14 in the above described embodiment, non fixed data may be multiplied by non fixed data. In this case, a two-port RAM will be provided instead of the ROM 14. In addition, in case where three or more multipliers and three or more ALU's are provided, it is needed to provide two RAM's each having ports whose number is equal to the number of the multipliers or one-port RAM's whose number is twice as large as the number of the multipliers.

If the access speed of the RAM and the ROM used in the memory portion 1 is many times faster than the calculating speed of each multiplier provided in the arithmetic operation portion 3, data may be set in the multipliers in a time-sharing manner and in such a case, the number of RAM's and the number of ROM's can be decreased.

Figure 3:
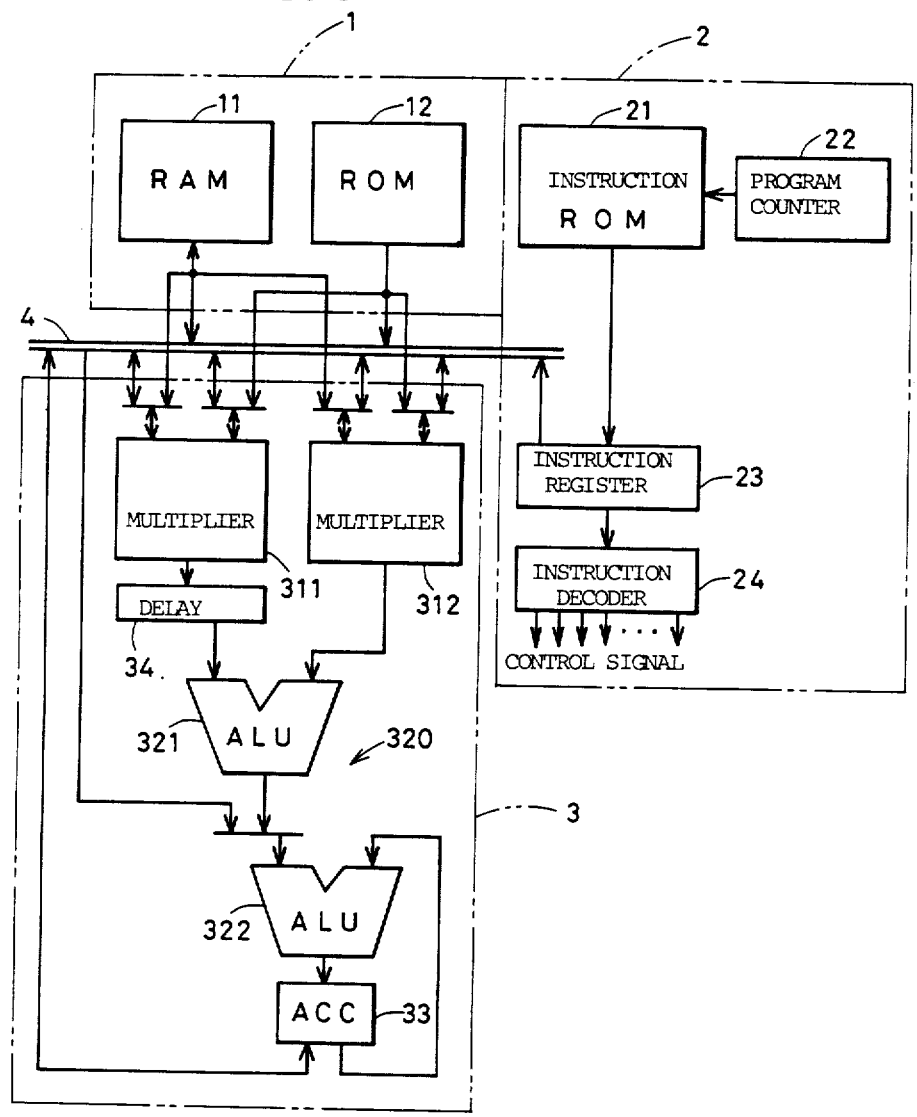
FIG. 3, is a schematic block diagram showing another embodiment of the present invention.

FIG. 3 is a schematic block diagram showing such another embodiment of the invention as stated above. Referring to FIG. 3, the access speed of each of the RAM 11 and the ROM 12 provided in the memory portion 1 is many times faster than the calculating speed of each of the first and second multipliers 311 and 312 provided in the arithmetic operation portion 3. An output of the RAM 11 is connected with the data bus 4 and is also connected with an input of each of the first and second multipliers 311 and 312. An output of the ROM 12 is connected with the data bus 4 and is also connected with the other inputs of the first and second multipliers 311 and 312. A delay circuit 34 is provided between the first multiplier 311 and the ALU 321. The other construction of this embodiment is the same as in the embodiment shown in FIG. 2.

In the above described construction, it is assumed that each of the multipliers 311 and 312 has a capacity for one multiplication operation for one machine cycle. The RAM 11 and the ROM 12 supply data to the first multiplier 311 in the first-half period of one machine cycle and supply data to the second multiplier 312 in the second-half period of one machine cycle. Consequently, the first and second multipliers 311 and 312 multiply the data in the period of one machine cycle but the output timing of the first multiplier 311 and that of the second multiplier 312 do not coincide. Therefore, the delay circuit 34 delays the output of the first multiplier 311 by a predetermined period of time so that the results of multiplication from the first and second multipliers 311 and 312 can be inputted to the ALU 321 simultaneously. The other operation is the same as in the embodiment shown in FIG. 1.

Figure 4:
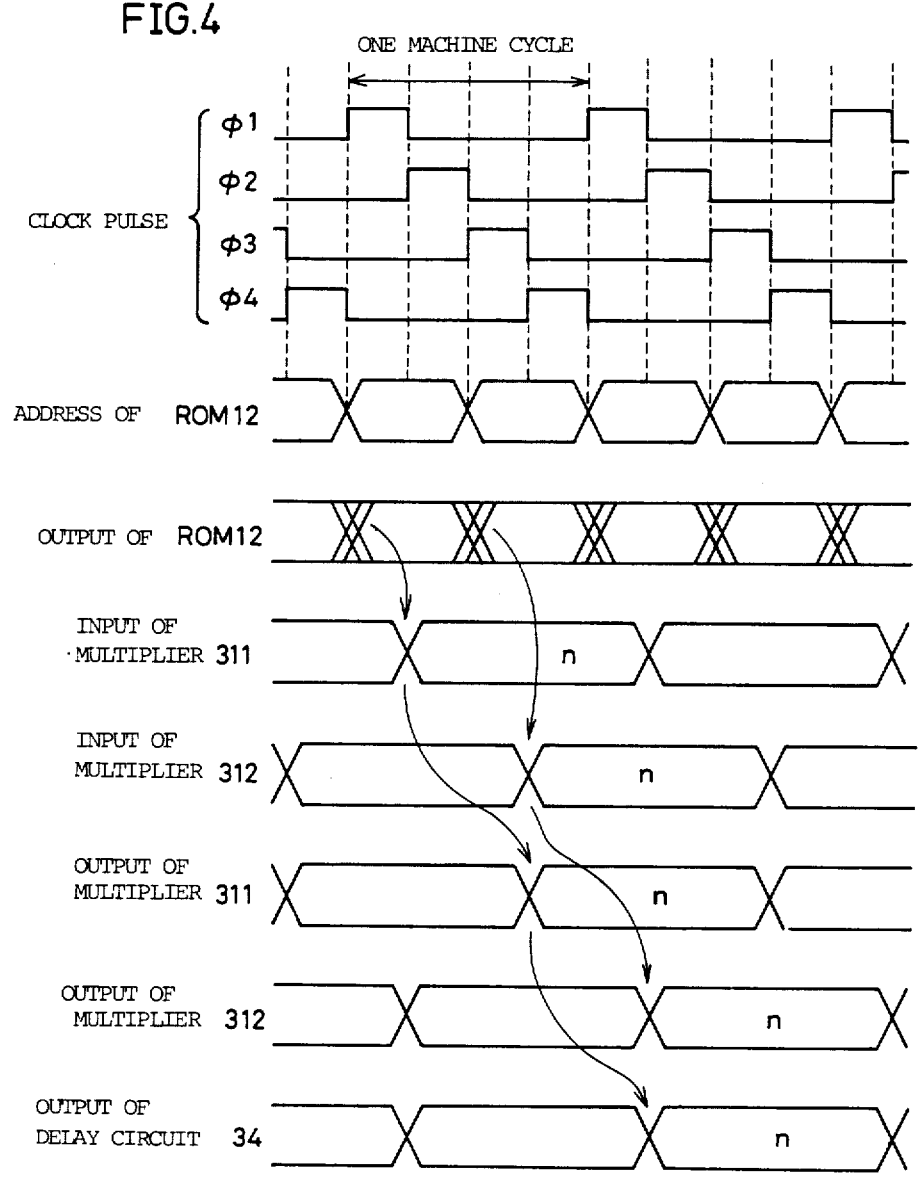
FIG. 4 is a time chart for explaining operation of the embodiment shown in FIG. 3.
Figure 5:
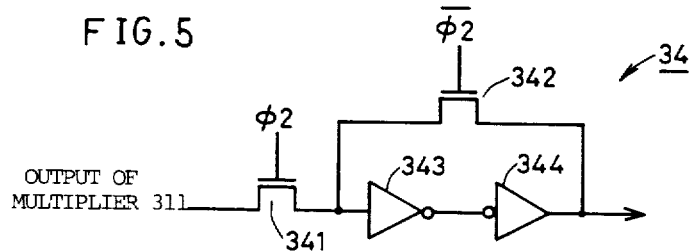
FIG. 5 is a circuit diagram showing an example of the delay circuit shown in FIG. 3.

The above described operation will be more specifically explained with reference to FIG. 4. FIG. 4 shows a case in which one machine cycle is defined by a cycle of clock pulses $\phi 1$ to $\phi 4$. In the period of one machine cycle, the address in the ROM 12 is changed twice in response to the clock pulses $\phi 1$ and $\phi 3$ so that data is read out from the ROM 12. Data in the ROM 12 is inputted to the multipliers 311 and 312 in response to the clock pulses $\phi 2$ and $\phi 4$, respectively, so as to start multiplication. The multipliers 311 and 322 latch the output in response to the clock pulses $\phi 4$ and $\phi 2$, respectively. The output from the multiplier 311 has a phase advanced by $\frac{1}{2}$ machine cycle compared with the output from the multiplier 312 and therefore the phases of the outputs are made coincide in the delay circuit 34 so that the outputs from the multipliers 311 and 312 are provided to the ALU 321. An example of the delay circuit 34 used in this case is shown in FIG. 5. FIG. 5 shows a so-called static register comprising two MOS transistors 341 and 342 and two inverters 343 and 344. The MOS transistor 341 is controlled by the clock pulse $\phi 2$ and the MOS transistor 342 is controlled by an inverted clock $\bar{\phi}2$ of the clock pulse $\phi 2$. More specifically, when the clock $\phi 2$ rises, the MOS transistor 341 turns on and the MOS transistor 342 turns off, whereby the data latched in the inverters 343 and 344 and the MOS transistor 342 are outputted.

In the above described respective embodiments, two ALU's are provided. However, if the calculating speed of such an ALU is many times faster than the multiplying speed of each multiplier, only one ALU is needed to make addition of the results of multiplication from the respective multipliers and to add the result of addition to the accumulating total value in the accumulator 33. It is the same with the case using three or more multipliers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital signal processor dedicated to digital signal processing, comprising a memory portion, a control portion, an arithmetic operation portion and a data bus serving as a data transmission line among said memory portion, said control portion and said arithmetic operation portion, said memory portion comprising data memories for storing data to be multiplied, said control portion comprising:
a program memory for storing data,
reading means for reading out successively the program data stored in said program memory, and
output means for providing various control signals based on said program data read out from said program memory, said arithmetic operation portion comprising:
a plurality of multipliers connected directly with said data memories for multiplying data provided from said data memories,
an arithmetic and logic unit including a plurality of arithmetic and logic circuits, said arithmetic and logic unit connected directly with said plurality of multipliers for applying determined arithmetic and logic operation to outputs of said multipliers, and
an accumulator for storing temporarily an output of said arithmetic and logic unit so that said output is supplied to said data bus.

2. A digital signal processor in accordance with claim 1, wherein
said plurality of arithmetic and logic circuits comprise:
an arithmetic and logic circuit for addition processing connected directly with said plurality of multipliers so as to add the outputs of said plurality of multipliers, and
an arithmetic and logic circuit for accumulation processing connected directly with said arithmetic and logic circuit for addition processing and connected with said accumulator so as to add an output of said arithmetic and logic circuit for addition processing to a value stored in said accumulator.

3. A digital signal processor in accordance with claim 1, wherein said data memories comprise a plurality of memories.

4. A digital signal processor in accordance with claim 3, wherein
said plurality of memories comprise:

a random access memory for storing non-constant data, and a read-only memory for storing constant data.

5. A digital signal processor dedicated to digital signal processing, comprising a memory portion, a control portion, an arithmetic operation portion and a data bus serving as a data transmission line among said memory portion, said control portion and said arithmetic operation portion, said memory portion comprising data memories for storing data to be multiplied including a random access memory for storing non-constant data, and a read-only memory for storing constant data, said random access memory having a plurality of output ports, and said read-only memory having a number of memory areas capable of reading out data independently, said control portion comprising:

a program memory for storing data, reading means for reading out successively the program data stored in said program memory, and output means for providing various control signals based on said program data read out from said program memory, said arithmetic operation portion comprising:

a plurality of multipliers, each having an input connected directly with a corresponding output port of said random access memory, for multiplying data provided from said data memories, the number of said memory areas of said read-only memory being equal to a number of said multipliers, an arithmetic and logic unit connected directly with said plurality of multipliers for applying predetermined arithmetic and logic operation to outputs of said multipliers, and an accumulator for storing temporarily an output of said arithmetic and logic unit so that said output is supplied to said data bus.

6. A digital signal processor dedicated to digital signal processing, comprising a memory portion, a control portion, an arithmetic operation portion and a data bus serving as a data transmission line among said memory portion, said control portion and said arithmetic operation portion, said memory portion comprising data memories for storing data to be multiplied, said control portion comprising:

a program memory for storing data, reading means for reading out successively the program data stored in said program memory, and output means for providing various control signals based on said program data read out from said program memory, said arithmetic operation portion comprising:

a plurality of multipliers connected directly with said data memories for multiplying data provided from said data memories, wherein said data memories have a sufficiently high access speed compared with a processing speed of said multipliers so that data can be transmitted from said data memories to each of said multipliers in a time-sharing manner, an arithmetic and logic unit connected directly with said plurality of multipliers for applying predetermined arithmetic and logic operation to the outputs of said multipliers, and an accumulator for storing temporarily an output of said arithmetic and logic unit so that said output is supplied to said data bus.

* * * * *